United States Patent Office 2,869,385
Patented Jan. 20, 1959

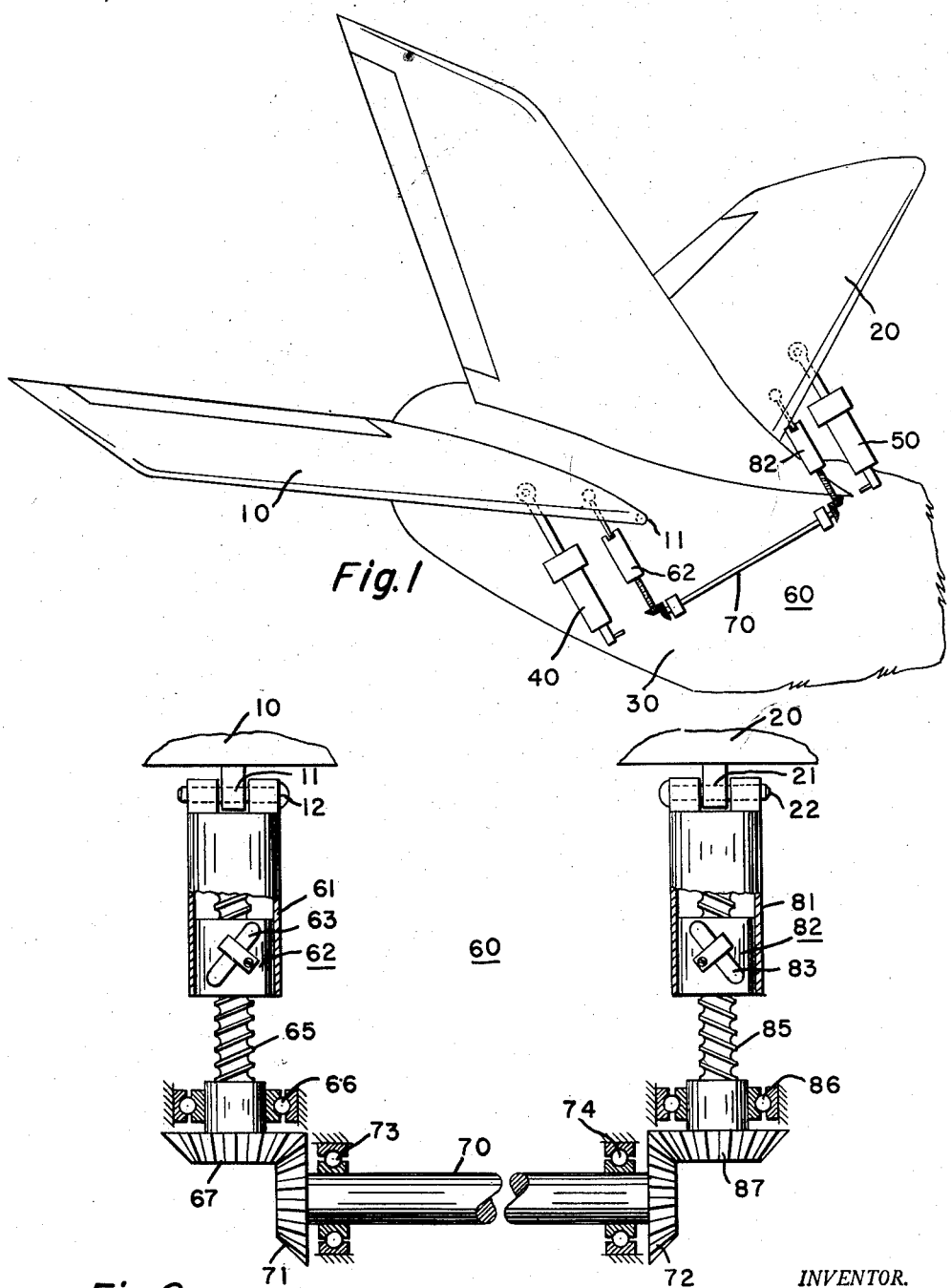

2,869,385
MEANS FOR INTERCONNECTING CONTROL SURFACES

Howard M. Geyer, Dayton, Ohio, assignor to General Motors Corporation, Detroit, Mich., a corporation of Delaware Application November 2, 1953, Serial No. 389,730

3 Claims. (Cl. 74—424.8)

This invention pertains to means for interconnecting movable elements, and particularly to means for assuring like movement of aircraft control surfaces.

Heretofore, it has been common practice to employ either cumbersome yoke arrangements to interconnect aircraft control surfaces, such as hinged tail members, or synchronized actuator systems. However, each of these expedients has drawbacks inasmuch as the yoke arrangements are heavy and difficult to position in modern aircraft, and the cost of synchronized actuator systems is prohibitive. Accordingly, among my objects are the provision of simplified, light weight means for interconnecting aircraft control surfaces, and the further provision of means for assuring like movement of a pair of movable elements which are positioned by individual actuators.

The aforementioned and other objects are accomplished in the present inveniton by providing power transmitting means between the control surfaces to be synchronized. Specifically, the embodiment disclosed comprises the use of a pair of ball-screw and nut assemblies of opposite senses, i. e. left and right-hand threaded assemblies. Each load device, a tail member as disclosed, is provided with an independent actuator for effecting pivotal movement thereof. However, it is to be understood that the load devices herein illustrated are only by way of example, and are not to be construed by way of limitation. Each tail member has attached thereto a hollow sleeve member, which carries the nut of a ball-screw and nut assembly. The nuts threadedly engage screw shafts through the medium of a plurality of circulating balls, the screw shafts being threaded in opposite directions.

The screw shafts are rotatably journaled within the aircraft fuselage and carry bevel gears. Each bevel gear meshes with another bevel gear carried by an interconnecting shaft. Accordingly, when the actuators are energized to effect movement of their respective tail members, the interconnecting means of this invention will synchronize their movement, the advantages of which are readily apparent.

Further objects and advantages of the present invention will be apparent from the following description, reference being had to the accompanying drawing wherein a preferred embodiment of the present invention is clearly shown.

In the drawing:

Fig. 1 is a fragmentary view, in perspective, of an aircraft tail assembly incorporating the interconnecting means of this invention.

Fig. 2 is a fragmentary view, partly in section and partly in elevation, of the interconnecting means.

With particular reference to Fig. 1, the tail section of an aircraft is shown including a pair of tail members 10 and 20, which are pivotally mounted by hinged means, only one, 11, of which is shown, to the fuselage 30 of the craft. In order to effect pivotal movement of the tail members 10 and 20, independtently operable actuators 40 and 50 are employed. The actuators may be of the dual drive type, as shown in my Patent No. 2, 620,683, issued December 9, 1952, or of the hydraulic self-locking type disclosed in my Patent No. 2,643,642, issued June 30, 1953. Each actuator includes a cylinder having disposed therein a reciprocable piston, not shown, having a rod which projects through an end wall of the cylinder. As the cylinder and piston are adapted for relative linear movement, either the cylinder or the piston rod may be attached to a tail member, with the other component being rigidly attached to the fuselage.

As is well known to those skilled in the art, control surfaces, such as hinged tail members, must be moved in unison to effect proper control of the aircraft. Heretofore, cumbersome yoke assemblies have been employed to synchronize pivotal movement of the tail members. This invention seeks to provide simplified interconnecting means which are disclosed generally by the numeral 60 in Fig. 1.

With particular reference to Fig. 2, the interconnecting means 60 will be described in detail. Tail member 10 has attached thereto a clevis 11, and tail member 20 has attached thereto a clevis 21. Clevis 11 is attached by a bolt 12 to a hollow sleeve member 61, while clevis 21 is attached by bolt 22 to a hollow sleeve member 81. The hollow sleeve member 61 is rigidly connected to and carries a nut 62 having an internal spiral groove, which may be of semi-circular cross section, and a circulating passage 63. In a similar manner, the sleeve 81 carries a nut 82 having an internal spiral groove and a circulating passageway 83. The nuts 62 and 82 constitute component parts of the well known ball-screw and nut assembly, and threadedly engage screw shafts 65 and 85 through the medium of a plurality of circulating balls, not shown. It should be noted that the ball-screw and nut assembly associated with tail member 10 is opposite in sense to the ball-screw and nut assembly associated with the tail member 20. That is, the ball-screw and nut assembly associated with tail member 10 is of right-hand thread, whereas the ball-screw and nut assembly associated with tail member 20 is of left-hand thread.

Inasmuch as the nuts of the ball-screw and nut assemblies are attached to the tail members, they are restrained against rotation and constrained for lineal movement with the tail assemblies, while the screws 65 and 85 are rotatably supported in the aircraft fuselage by bearing means 66 and 86. However, inasmuch as the interconnecting means operates by effecting relative rotation between the nuts and screws, it will be appreciated that either the nuts or screws may be attached to the tail members, all within the scope of this invention.

The screw shaft 65 has attached thereto a bevel gear 67, while the screw shaft 85 has attached thereto a bevel gear 87. Bevel gear 67 meshes with a bevel gear 71 and bevel gear 87 meshes with a bevel gear 72. The bevel gears 71 and 72 are attached to an interconnecting shaft 70, which is supported by bearings 73 and 74 within the aircraft fuselage.

Operation

The interconnecting means operates as follows when the actuators 40 and 50 are energized. Upon operation of the actuators so as to effect pivotal movement of the tail members 10 and 20 about their hinges, linear movement will be imparted to the nuts 62 and 82. Inasmuch as the nut members threadedly engage the screw members 65 and 85, rotation in opposite directions will be imparted thereto. Moreover, as the screw members 65 and 85 are interconnected by the shaft 70 through gearing, rotation will be imparted to the shaft 70 by which means movements of the tail members 10 and 20 will be maintained in synchronism.

From the foregoing, it is manifest that the present invention provides exceedingly simple means for interconnecting control surfaces, which are to be moved in synchronism. Moreover, the means disclosed herein may be conveniently employed wherever it is necessary to move load devices in unison, which load devices are moved by independent power means, such as actuators.

While the embodiment of the present invention as herein disclosed, constitutes a preferred form, it is to be understood that other forms might be adopted.

What is claimed is as follows:

1. The combination with a pair of movable elements and a pair of independent actuators for effecting movement of said elements, of means for effecting synchronous movement of said elements upon operation of their respective actuators comprising, a non-rotatable member operatively connected to each element, a rotatable member operatively engaging each non-rotatable member such that upon movement of said elements said rotatable members will rotate, and torque transmitting means interconnecting said rotatable members to mechanically synchronize movement of said elements.

2. In combination, a pair of load devices, a pair of independent actuators for effecting movement of said load devices, a non-rotatable nut attached to each load device and constrained for movement therewith, a rotatable screw shaft having threaded engagement with the nut of each load device, and mechanical power transmitting means operatively interconnecting the screw shafts so as to mechanically synchronize movement of said load devices.

3. In combination, a pair of movable control surfaces, a pair of independent actuators for effecting movement of said control surfaces, and means for effecting synchronous movement of said control surfaces upon operation of their respective actuators comprising, a member having a driving connection with each control surface so as to rotate in response to movement thereof, the driving connection between each member and its respective control surface including a reciprocable element having a helical driving connection with its respective rotatable member and constrained to move with its respective control surface, and torque transmitting means interconnecting the rotatable members so as to mechanically synchronize movement of said control surfaces.

References Cited in the file of this patent

UNITED STATES PATENTS

| Number | Name | Date |
|---|---|---|
| 428,196 | Young | May 20, 1890 |
| 1,208,353 | Mudge | Dec. 12, 1916 |
| 1,616,415 | Day | Feb. 1, 1927 |
| 2,075,741 | Miller | Mar. 30, 1937 |
| 2,376,320 | Butrovich et al. | May 22, 1945 |
| 2,396,781 | Glynn | Mar. 19, 1946 |
| 2,479,409 | Rapuano | Aug. 15, 1949 |
| 2,487,116 | Eaton | Nov. 8, 1949 |
| 2,626,670 | Moore | Jan. 27, 1953 |